United States Patent
Fouchet et al.

(10) Patent No.: US 8,691,937 B2
(45) Date of Patent: Apr. 8, 2014

(54) METHOD FOR THE PREPARATION OF LOW ODOR COPOLYMER LATEXES

(75) Inventors: Bernard Fouchet, Strasbourg (FR); Gerold Lohmueller, Baden-Baden (DE); Patric Eckerle, Rheinau (DE)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 13/518,154

(22) PCT Filed: Dec. 16, 2010

(86) PCT No.: PCT/US2010/060707
§ 371 (c)(1),
(2), (4) Date: Nov. 30, 2012

(87) PCT Pub. No.: WO2011/079011
PCT Pub. Date: Jun. 30, 2011

(65) Prior Publication Data
US 2013/0066011 A1 Mar. 14, 2013

Related U.S. Application Data

(60) Provisional application No. 61/289,605, filed on Dec. 23, 2009.

(51) Int. Cl.
*C08C 2/06* (2006.01)
*C08G 75/02* (2006.01)

(52) U.S. Cl.
USPC ............ 528/500; 525/556; 525/565; 525/575

(58) Field of Classification Search
USPC ......................................... 524/556, 565, 575
See application file for complete search history.

(56) References Cited

U.S. PATENT DOCUMENTS

| 3,974,117 A | 8/1976 | Illmann et al. |
| 6,624,207 B2 | 9/2003 | Balk et al. |
| 7,015,294 B2 | 3/2006 | Dausch et al. |
| 2005/0069510 A1 | 3/2005 | Drohmann et al. |

FOREIGN PATENT DOCUMENTS

| CN | 1473168 A | 2/2004 |
| CN | 1606599 A | 4/2005 |
| JP | 07216018 | 8/1995 |
| KR | 1020080056947 | 6/2008 |
| WO | 0100683 | 1/2001 |
| WO | WO2008/017406 A1 | 2/2008 |

OTHER PUBLICATIONS

Notification of Office Action, Chinese Patent Application No. 201080058996.1, dated Jul. 3, 2013, 15 pgs. State Intellectual Property Office of the People's Republic of China.
Extended European Search Report for Application No. EP10840003.7 dated May 7, 2013, 4 pgs. European Patent Office.

*Primary Examiner* — Terressa Boykin
(74) *Attorney, Agent, or Firm* — Brinks, Gilson & Lione

(57) ABSTRACT

A method of preparing a low odor polymer latex composition includes the step of polymerizing a monovinylidene monomer, such as styrene, and a conjugated diene, such as butadiene, in the presence of a linear alkyl thiol chain transfer agent. The resulting polymer latex is treated with an oxidizing agent to oxidize residual chain transfer agent to volatile decomposition products that are then removed by steam stripping.

19 Claims, No Drawings

METHOD FOR THE PREPARATION OF LOW ODOR COPOLYMER LATEXES

CROSS REFERENCE TO RELATED APPLICATIONS

This application is a 371 of PCT/US2010/060707 filed Dec. 16, 2010, which claims the benefit of U.S. Provisional Application Ser. No. 61/289,605, filed Dec. 23, 2009.

This invention relates to copolymer latexes, and in particular to copolymer latexes for paper and paperboard coating and carpet backing applications. Copolymer latexes have many commercial uses, in particular in compositions for use as coatings. Copolymers of styrene and butadiene (SB copolymers) in particular are widely used in the preparations for coating paper. The polymerisation processes used to prepare such copolymers generally require the use of a chain transfer agent, in order to control the molecular weight of the polymer product.

Various chain transfer agents have been used, for example compounds containing sulfhydryl groups (in particular, mercaptans), chlorinated hydrocarbons such as carbon tetrachloride, and various other non sulphur-containing materials, such as t-butylhydroperoxide, and colophonium. Chlorinated hydrocarbons such as carbon tetrachloride have fallen out of favour however, and they are not commonly employed in current industrial practice. Although compounds such as t-butylhydroperoxide and colophonium produce less undesirable odours than mercaptans, they are significantly less effective as chain transfer agents than mercaptans.

As a consequence, in recent times, mercaptan-type chain transfer agents are the materials of choice.

A major disadvantage of sulphur-containing chain transfer agents however is that residual sulphur-containing materials in the product and sulphur end groups in the polymer chain cause undesirable odour in the coated product, particularly when the product is exposed to heat. This makes the products unsuitable for use in some applications, in particular in the food packaging and cigarette packaging field.

Various proposals have been made to reduce the amounts of residual mercaptan in SB polymer latexes. For example, JP-A-07-216018 describes a method in which the latex is treated with an oxidising agent, for example a peroxide or perboric acid. Although partially successful, such methods have not been able to provide latexes that are sufficiently low in odour, when used in coating applications for demanding applications, such as food packaging and cigarette packaging.

DE-A-2354681 discloses the deodorisation of acrylate latexes, useful for floor polishes, by treatment with hydrogen peroxide, at a temperature of from 60-95° C.

In accordance with one aspect of the invention, there is provided a method of preparing a polymer composition, comprising;
polymerising one or more monomers in a free radical polymerisation in the presence of a chain transfer agent to produce a first polymer latex, wherein the chain transfer agent is a linear alkyl thiol;
treating the first polymer latex with an oxidising agent to oxidise residual chain transfer agent to decomposition products capable of removal by steam stripping; and
subjecting the reaction mixture to steam stripping to remove at least some of said decomposition products from the reaction mixture. The polymerisation is preferably an emulsion polymerisation.

In accordance with a preferred aspect of the invention, there is provided a method of preparing a polymer latex composition, comprising polymerising a monovinylidene monomer and a conjugated diene in the presence of a chain transfer agent that is a linear alkyl thiol, to produce a first polymer latex, treating the first polymer latex with an oxidising agent to oxidise residual chain transfer agent to decomposition products capable of removal by steam stripping, and subjecting the reaction mixture to steam stripping to remove at least some of said decomposition products from the reaction mixture.

In accordance with the invention, we have discovered that the odour profile of compositions including linear sulfhydryl-type chain transfer agents can be improved significantly, by means of a two step process, in which the residual sulphur-containing products and sulphur-containing end groups in the polymer chain are first oxidised to a volatile decomposition product, using an oxidising agent, and thereafter the volatile decomposition products are removed from the reaction mixture, by means of steam stripping. The oxidising agent to be employed in the first step of the procedure may be any oxidising agent that is able to oxidise the residual chain transfer agent without adversely affecting the polymer latex. Suitable oxidising agents are inorganic oxidants such as, for example, sodium chlorate, sodium perchlorate, and sodium peroxide, and perboric salts such as, for example, sodium perborate and potassium perborate, or, preferably, hydrogen peroxide, or t-butyl hydroperoxide. The oxidising agent is preferably used in an amount of from 0.1 to 2.5 wt. parts, preferably from 0.2 to 1.5 wt. parts, more preferably 0.6 to 1.1 wt. parts, based on the total monomer content employed expressed as 100 weight parts monomer. Mixtures of oxidising agents can be employed.

Although many different types of mercaptan are effective as chain transfer agent we have discovered, in accordance with the present invention, that in order to minimise the odour of the final product, it is important to select a linear alkyl thiol as the mercaptan chain transfer agent. Although not wishing to be bound by any theory of operation, it is believed that this may due to the fact that such compounds generate, when oxidised, decomposition products that are relatively uniform in molecular weight, and thus susceptible to effective steam stripping. Examples of suitable linear alkyl thiols for use as chain transfer agents in accordance with the present invention are n-octylmercaptan, n-decylmercaptan, n-tetradecylmercaptan and, most preferably, n-dodecylmercaptan (n-DDM). The chain transfer agent is generally used in an amount of from 0.1 to 2 wt. parts, preferably from 0.1 to 1.7 wt. parts, more preferably 0.5 to 1.8 wt. parts, based on the total monomer content employed expressed as 100 weight parts monomer.

The method of the invention may be employed in any polymerisation process in which chain transfer agents (in particular, mercaptan-type chain transfer agents) are known to be useful. It is particularly applicable however to the preparation of polymer latex compositions prepared by polymerising an ethylenically unsaturated aromatic monomer such as styrene, with a conjugated diene monomer such a butadiene. Such styrene/butadiene latexes are widely used in the paper and board-coating industries to manufacture and coat paper and paper board, prior to printing, and in the preparation of formulations used in carpet manufacturing. The method of the invention is particularly useful in the manufacture of latexes that are processed at high temperature during or after their manufacture, or that are subjected to high energy (such as UV or EB beams) or other treatments likely to lead to decomposition of residual mercaptan chain transfer agent, and consequent odour. For example, the method is useful in the manufacture of latexes that are intended for use in applications such as paper and paperboard coating or carpet backing in which they are subjected to calendaring or other processes in which they are subjected to temperatures in excess of 50° C., at which the odour threshold of sulfur-containing compounds is exceeded and after which they may begin to decompose.

The oxidation may preferably be carried out at a temperature of from 70 to 125° C., most preferably 85 to 115° C.

The ethylenically unsaturated aromatic monomer used in the preparation of the polymer latex is preferably a monovinyl or vinylidene aromatic monomer of the formula $CH_2=CR—Ar$, wherein R is hydrogen or $C_{1-4}$ alkyl and Ar is a $C_6$ aromatic radical that is optionally substituted by at least one $C_{1-4}$ alkyl group, or chlorine or bromine. Preferred ethylenically unsaturated aromatic monomers are styrene, alpha-methyl styrene, vinyl toluene, and $C_{1-4}$ alkyl and chloro and bromo derivatives thereof. The most preferred is styrene.

The amount of the ethylenically unsaturated aromatic monomer mixture is preferably from 20 to 70 weight %, more preferably from 30 to 60 weight %, based on the monomer mixture. The percentage of all monomers in the monomer mixture totals to 100%.

The conjugated diene preferably constitutes from 10 to 80 weight %, more preferably from 20 to 80 weight % still more preferably from 20 to 70 weight %, typically from 30 to 60 weight % of the monomer mixture. The conjugated diene is preferably a $C_{4-6}$ aliphatic conjugated diene, for example 1,3 butadiene, 2-methyl-1,3-butadiene or a chlorinated butadiene. The preferred conjugated dienes are 1,3-butadiene and isoprene, particularly 1,3-butadiene.

The monomer mixture also preferably includes an ethylenically unsaturated carboxylic acid, for example acrylic acid, methacrylic acid, itaconic acid, fumaric acid, crotonic acid or maleic acid. The ethylenically unsaturated carboxylic acid increases the reaction rate, allowing a higher monomer conversion to be achieved in a shorter time, as well as increasing the stability of the product. The amount of ethylenically unsaturated carboxylic acid is preferably from 0.5 to 20% by weight, more preferably from 1 to 10%, more preferably from 2 to 8%, based on the monomer mixture. The ethylenically unsaturated carboxylic acid is preferably a C3-6 ethylenically unsaturated carboxylic acid, and may contain one or two carboxylic acid groups. Suitable acids include itaconic acid, fumaric acid, maleic acid, acrylic acid and methacrylic acid. A mixture of two or more such acids may be employed.

The monomer mixture may also contain an alkyl acrylate or methacrylate (abbreviated herein to alkyl(meth)acrylate). The amount of the alkyl (meth)acrylate has an effect on the printability of paper coated with the resulting latex composition, particularly by rotogravure printing processes. The amount of the alkyl (meth)acrylate may be from 40 to 0.5 weight %, preferably from 30 to 1 weight %, more preferably from 20 to 4 weight %, of the monomer mixture. Suitable alkyl (meth)acrylates for use in accordance with the invention are ($C_1$-$C_{20}$) alkyl esters of acrylic or methacrylic acid, for example methylacrylate, methyl methacrylate, ethylacrylate, ethyl methacrylate, butylacrylate, butyl methacrylate, 2-ethyl-hexylacrylate or 2-ethyl-hexyl methacrylate. Mixtures of two or more alkyl acrylates may also be used. Butylacrylate is preferred.

The monomer mixture may also contain additional ethylenically unsaturated monomers. Examples of such additional monomers are an unsaturated nitrile, for example acrylonitrile. Other possible additional monomers are hydroxyl functional or amine-functional vinyl monomers such as, for example, hydroxyethyl (meth)acrylate, and acrylamide or a derivative thereof. One or more such additional ethylenically unsaturated monomers may be employed in a total amount of from 0.5 to 20% by weight, based on the monomer mixture.

After preparation, the pH of the latex will generally be acidic, and may be adjusted to a range of from 5 to 10 using suitable bases such as sodium or potassium hydroxide, or ammonia, and optionally a salt buffer. Thickeners, bactericides and stabilizers such as surfactants, and protective colloids may also be added, as is conventional in compositions of this type. These adjustments are well known to those skilled in the art.

A number of preferred embodiments of the invention are described in the following Examples. In the Examples, all parts are by weight, unless otherwise stated.

EXAMPLE 1

A latex is prepared by emulsion polymerizing a monomer composition of
57 weight parts styrene,
39 weight parts butadiene,
1 weight parts itaconic acid,
3 weight parts acrylic acid,
0.6 parts by weight (per 100 weight parts total monomers) of surfactant (DOWFAX® 2A1), and
0.7 parts by weight (per 100 weight parts total monomers) of n-dodecylmercaptan (n-DDM).

The polymerization is carried out as a seeded radical emulsion polymerization with a particle size range of 100 to 150 nanometers (nm) at a temperature of from 70° C. to 95° C.

The polymerization is carried out using an initial polystyrene seed latex having a volume average particle size of 21.5 nm in an amount corresponding to 0.65 parts per 100 parts of total monomer to be polymerized. The seed latex (0.65 parts) is added to an initial aqueous medium containing 78.28 parts deionized water, 1 part itaconic acid, and 0.150 parts of a non-ionic surfactant (alkyldiphenyloxide disulfonate salt Dowfax® 2A1), and 0.020 parts of a chelating agent (trisodium salt of N-(hydroxyethyl) ethylenediaminetriacetic acid—Versenol® 120.

The monomer feed is started, and the reaction mixture is agitated during monomer addition at a rate of 250 rpm. An additional aqueous stream is fed to the reactor over the course of the reaction containing Dowfax 2A1 surfactant, sodium persulfate and sodium hydroxide, in an amount such that the total addition over the course of the reaction amounts to 0.6 parts of Dowfax 2A1 surfactant, 0.8 parts of sodium persulfate and 0.15 parts of sodium hydroxide in 17 parts by weight of water, (per 100 parts total monomers).

After completion of the monomer addition, the reaction mixture is heated at the reaction temperature for a further period of one hour.

The resulting polymer latex was stabilized with a solution of 10% NaOH.

The product is treated for 20 minutes with hydrogen peroxide (0.7 weight parts active peroxide based on 100 weight parts monomer as a 30% aqueous hydrogen peroxide), at the treatment temperature shown in Table 1, in order to oxidise residual sulphur containing materials.

Finally, steam stripping is carried out by heating the latex to 100° C. and passing steam through the latex, until an amount of condensate has been collected that corresponds to from 2.5 to 3 times by weight of the amount of latex (calculated on a wet basis). The latex is then cooled to ambient temperature and filtered.

EXAMPLE 2 AND COMPARATIVE EXAMPLES 1 TO 5

Example 2 is prepared in the same manner as Example 1, but using 22,000 ppm $H_2O_2$ instead of 6000 ppm and heating the latex at 95° C. for two hours instead of 112° for 20 minutes. $H_2O_2$.

Comparative Example 1 is produced in the same way as Example 1, but without treatment with peroxide before the steam stripping step.

Comparative Example 2 is prepared in the same manner as Example 1, but using colophonium (a non-sulphur containing chain-transfer agent) instead of n-DDM.

Comparative Example 3 is prepared in the same manner as Example 1, but using t-BHP (t-butylhydroperoxide) (a non-sulphur containing chain-transfer agent) instead of nDDM.

Comparative Example 4 is produced in the same way as Example 2, but carrying out the treatment with peroxide after the steam stripping step, rather than before it.

Comparative Example 5 is prepared in the same manner as Example 1, but without the use of a chain transfer agent.

Comparative Example 6 is prepared in the same manner as Example 1, but using tertiarydodecylmercaptan (tDDM) instead of n-DDM—with a 22000 ppm $H_2O_2$ treatment and heating the latex at 95° C., for two hours instead of 112° C. for 20 minutes. $H_2O_2$.

Comparative Example 7 is prepared in the same manner as Example 1, but using tDDM instead of n-DDM and without $H_2O_2$ treatment.

Measurement of Physical Properties

Various physical properties of the latexes are determined by the methods described below. The results are shown in Table 1.

Tg Measurement by DSC

The glass transition temperature of the latex is measured with a Differential Scanning calorimeter DSC 30 (Mettler), by the following method. The latex is poured into 40 microliter (PI) aluminium cups, dried overnight at room temperature, and then for one hour at 100° C. to remove residual traces of moisture. The DSC measurements are carried out over a temperature range of −40° C. to 120° C. at a heating rate of 10° C./min. The glass transition temperature is given as the midpoint of the DSC curve.

Gel Content and Swelling Index

Gel content is a measure of the solvent-insoluble fraction of the polymer. Swelling index measures the amount of solvent absorbed by the solvent-insoluble fraction of the polymer. For the determination of the gel content and swelling index (SWI) of the polymer latexes, toluene is used as the solvent. Dry films are made from the latexes adjusted to pH 8. A dry latex film is weighed (dry weight A) and then swollen for 24 hours with toluene. The toluene-insoluble wet gel is then separated by filtration and its weight (B) determined. The gel is then dried, and the dry weight (C) determined. The percent gel is calculated as:

% gel=weight dry gel($C$)/weight of latex film($A$)×100

The swelling index SWI is calculated as:

SWI=(weight wet gel($B$)−weight dry gel($C$))/weight of dry gel($C$)×100

Odor Test

Latexes are coated on a standard base sheet having a weight of 71 g/m² at a coat weight of 12 g/m². The formulation contains a 50/50 percent clay/calcium carbonate pigment mixture. The formulation is 62 percent solids and pH 8.5. An area of 5.5×3 cm of coated paper is put into a 100 ml closed glass bottle. The bottle is closed with aluminium foil and a screw cap and conditioned for 1 hour at 90° C. followed by 24 hours cooling to adjust to room temperature. After cooling to room temperature (within 1-1.5 hour) they are evaluated for odor.

Taste and Odour Evaluation Test Procedure

Samples are offered to a panel of trained volunteers in a taste & odour test room that is organised and furnished according to the recommendations in *ASTM Committee E-18: Physical Requirement Guidelines for Sensory Evaluation Laboratories, ASTM MNL* 60, 2*nd Edition* 2008 and O'Mahony, M., "*Sensory evaluation of food, Statistical methods and procedures*", M. Dekker, INC. New York 1986, (p. 165). The position of the individual samples in the series and the series themselves are randomized. The panel members are requested to judge the samples, offered in random order, using the following rating scale:

0=no odor
1=hardly perceptible odor
2=slightly perceptible odor
3=perceptible odor
4=strong odor
5=very strong odor After the rating the panel members are requested to give a forced ranking order to the samples using the following scale:

1=strongest odor
2=less strong odor
3=even less strong odor
4=weakest odor

Calculation Procedure:

The panel member scores are used as the basis of a statistical calculation. The individual scores of the panel members are used to calculate a mean rating and the sum of ranks for each sample. The results of the rating test are evaluated using the so-called ANOVA statistical procedure described in Van den Brink, W. P., "Statistics, Part 3", 2nd edition, Boom Meppel, Amsterdam, Koele P. This provides a qualitative judgement of differences between the obtained mean rating results. A so called DUNCAN multiple comparison test (as described in the same reference) is then used to give range values (DRV=Duncan Range Value). A DRV represents the minimum required significant difference (at a 95% confidence level) between mean rating results.

When the mean rating results are arranged in ascending order (e.g. XI, X2, X3, X4) then the first DRV (=2-mean range) is used to compare two successive samples in the table e.g. XI vs X2. The second DRV (=3-mean range) represents a comparison X1 vs X3 (or X2 vs X4). The third DRV (=4-mean range) compares X1 vs X4 etc.

The results of the ranking test are evaluated using a statistical procedure according to Friedman (as described in the "Statistics, Part 3" reference cited above). This provides a qualitative judgement of differences between the obtained sum of ranks in the form of a "Critical Difference" (CD). This CD represents the minimum required significant difference (at a 95% confidence level) between ranking sums.

Finally an odor profile ranking index rate was determined by rating samples on a 1 to 5 scale from 1=lowest odor to 5=worst odor based on the three descriptors—rating, ranking and irritating eyes—calculated from the panel evaluation.

Residual n-DDM:

10 g of latex is extracted with 20 ml of isooctane and 5 ml of Methanol after shaking for one hour. The isooctane extract is analyzed by GC with a sulfur detector.

TABLE 1

|  |  | Ex. 1 | Ex. 2 | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- | --- | --- |
| $H_2O_2$ level | ppm | 6000 | 22000 | 0 | 0 | 0 | 22000 | 0 | 22000 | 0 |
| $H_2O_2$ treatment Temp. | °C. | 112 | 95 | none | none | none | 95 | none | 95 | none |
| Chain transfer agent |  | nDDM | nDDM | nDDM | colophomium | tBHP | nDDM | none | tDDM | tDDM |
| $H_2O_2$ treatment (Y/N) |  | Y | Y | N | N | N | Y | N | Y | N |
| Steam Stripping (Y/N) |  | after $H_2O_2$ | after $H_2O_2$ | Y | Y | Y | before $H_2O_2$ | Y | Y | Y |
| Final latex pH | — | 7.6 | 5.5 | 7.7 | 5.2 | 5.3 | 5.5 | 5.1 | 5.3 | 5.6 |
| Particle size | nm | 123 | 145 | 123 | 101 | 112 | — | 148 | 143 | 145 |
| solids | % | 49.3 | 49.7 | 48.4 | 50.1 | 54.6 | 52.7 | 52.6 | 52.6 | 52.5 |
| Gel Content | % | 89.8 | 86.0 | 90.3 | 94.0 | 92.7 | 85.4 | 98.0 | 89.0 | 86.2 |
| Swelling Index | — | 3.6 | 4.3 | 3.5 | 3.3 | 5 | 5.4 | 2 | 4.5 | 4.8 |
| Tg (Mp) | °C. | 4.2 | 5.0 | 2.7 | 2.5 | 10 | — | 10 | 7.2 | 5.5 |

Paper coating properties such as binding strength are greatly influenced by gel content and comparable gel content is therefore a good indicator of comparable end use properties of the polymer. Example 1 shows the same chain transfer efficiency, monomer conversion and the same gel content (indicating similar polymer cross-linking density) as Comparative Example 1 and Comparative examples 6 and 7 made with conventional t-DDM.

Coated paper samples were prepared, using the polymer latexes of Example 2 and Comparative Examples 6 and 7 and were tested by the odour panel. The results are shown in Table 2.

TABLE 2

|  | Ex. 2 | Comp. Ex. 6 | Comp. Ex. 7 |
| --- | --- | --- | --- |
| Rating | 2.35 | 2.67 | 2.96 |
| Ranking | 70 | 60 | 41 |
| Irritating Eyes | 10/24 | 14/24 | 17/24 |
| Odour profile ranking index | 1 | 3 | 5 |

Number of panel members 23
Number of invalid contributions 1
DRV value 2 mean range 0.38
DRV value 3 mean range 0.40
DRV value 4 mean range 0.4
Critical difference 23

The results show that the coated paper of Comparative Example 7 (produced with t-DDM) has an irritating smell and the highest rating of 2.96. The coated paper produced according to Comparative Example 6 (produced with t-DDM and $H_2O_2$ treatment) has a lower odour rating than Comparative Example 7. The difference in the rating test between Comparative Example 6 and Example 2 is very close to the statistical significance limit of the test. However the three descriptors rating, ranking and irritating eyes aggregated in the odor profile ranking show the lowest odor to be achieved for the coated paper of Example 2 (produced with n-DDM and $H_2O_2$ treatment).

In a second series of tests, the latex of Example 1 is compared in a similar manner with that of Comparative Examples 1 to 3. The results are shown in Table 3:

TABLE 3

|  | Ex. 1 | Comp. Ex. 1 | Comp. Ex. 2 | Comp. Ex. 3 |
| --- | --- | --- | --- | --- |
| Rating | 2.95 | 3.75 | 2.45 | 2.55 |
| Ranking | 57 | 23 | 65 | 55 |
| Irritating Eyes | 10/20 | 19/20 | 7/20 | 9/20 |
| Odor profile ranking index | 2 | 5 | 1 | 2 |

Number of panel members 20
Number of invalid contributions 4
DRV value 2 mean range 0.43
DRV value 3 mean range 0.45
DRV value 4 mean range 0.47
Critical difference 21

The results show that the coated paper of Comparative Example 1 (produced with n-DDM) has an irritating smell and the highest rating 3.75. The coated paper produced according to Example 1 has an odour rating comparable to that produced using non-sulphur-containing chain transfer agents (Comparative Examples 2 and 3). The eye irritation test also shows significant improvement for Example 1, as compared with Comparative Example 1. Although there is a difference in the rating test between Comparative Example 2 and Example 1, the difference is very close to the statistical significance limit of the test.

In a further series of odour tests conducted in the same manner, the product of Example 2 was compared with the products of Comparative Examples 4 and 5. The results are shown in Table 4.

TABLE 4

|  | Ex. 2 | Comp. Ex. 4 | Comp. Ex. 5 |
| --- | --- | --- | --- |
| Rating | 2.22 | 2.5 | 2.02 |
| Ranking | 66 | 46 | 67 |

TABLE 4-continued

|  | Ex. 2 | Comp. Ex. 4 | Comp. Ex. 5 |
|---|---|---|---|
| Irritating Eyes | 10/24 | 10/24 | 7/24 |
| Odor profile ranking index | 1 | 3 | 1 |

Number of panel members 23
Number of invalid contributions 1
DRV value 2 mean ranee 0.35
DRV value 3 mean range 0.37
DRV value 4 mean range 0.38
Critical difference needed to be significantly irritating/offensive 23
At a confidence level of 95% 18/24

The results show that the product of Example 2 has similar scores in the odour tests to a material containing no thiol chain transfer agent, but that the latex of Comparative Example 4, in which the order of peroxide treatment and steam stripping was reversed has higher odour scores.

The invention claimed is:

1. A method of preparing a polymer composition, comprising;
    polymerizing one or more monomers in a free radical polymerization in the presence of a chain transfer agent to produce a first polymer latex, wherein the chain transfer agent is a linear alkyl thiol;
    treating the first polymer latex with an inorganic oxidizing agent to oxidize residual chain transfer agent to decomposition products capable of removal by steam stripping; and
    subjecting the reaction mixture to steam stripping to remove at least some of said decomposition products from the reaction mixture.

2. A method as claimed in claim 1, wherein the free radical polymerization is an emulsion polymerization.

3. A method as claimed in claim 1, wherein the one or more monomers comprise a monovinylidene monomer and a conjugated diene.

4. A method as claimed in claim 1, wherein the polymer latex is a styrene/butadiene latex.

5. A method as claimed in claim 1, wherein the inorganic oxidizing agent is hydrogen peroxide.

6. A method as claimed in claim 1, wherein the chain transfer agent is n-octylmercaptan, n-decylmercaptan, n-tetradecylmercaptan or n-dodecylmercaptan.

7. A method as claimed in claim 1, wherein the chain transfer agent is used in an amount of from 0.1 to 2 wt. %, based on the total monomer employed.

8. A method as claimed in claim 1, wherein the oxidation is carried out at a temperature of from 85 to 115° C.

9. A method as claimed in claim 1, and including the step of adjusting the pH of the polymer latex pH to a value of from 5 to 10, by the addition of a base and optionally a salt buffer.

10. A method as claimed in claim 8, wherein the base is sodium hydroxide or potassium hydroxide.

11. A method as claimed in claim 8, wherein the salt buffer is sodium bicarbonate or sodium acetate.

12. A method as claimed in claim 6, wherein the chain transfer agent is n-dodecylmercaptan (n-DDM).

13. A method as claimed in claim 1, wherein the monomer mixture also includes an ethylenically unsaturated carboxylic acid.

14. A method as claimed in claim 1, wherein the monomer mixture includes acrylonitrile.

15. A method as claimed in claim 1, wherein the preparation method includes a step in which the latex is treated at a temperature of at least 50 C.

16. A method of preparing a polymer composition, comprising;
    polymerizing one or more monomers in a free radical polymerization in the presence of a chain transfer agent to produce a first polymer latex, wherein the chain transfer agent is a linear alkyl thiol;
    treating the first polymer latex with an oxidizing agent to oxidize residual chain transfer agent to decomposition products capable of removal by steam stripping, wherein the oxidizing agent is added in an amount from 0.6 to 1.1 wt. parts, based on a total monomer content; and
    subjecting the reaction mixture to steam stripping to remove at least some of said decomposition products from the reaction mixture.

17. The method of claim 16, wherein the oxidizing agent is an inorganic oxidizing agent.

18. A method of preparing a polymer composition, comprising;
    polymerizing one or more monomers in a free radical polymerization in the presence of a chain transfer agent to produce a first polymer latex, wherein the chain transfer agent is a linear alkyl thiol;
    treating the first polymer latex with a composition to oxidize residual chain transfer agent to decomposition products capable of removal by steam stripping, wherein the composition consists of an oxidizing agent; and
    subjecting the reaction mixture to steam stripping to remove at least some of said decomposition products from the reaction mixture.

19. The method of claim 18, wherein the oxidizing agent is an inorganic oxidizing agent.

* * * * *